United States Patent [19]

Wright

[11] 4,305,248

[45] Dec. 15, 1981

[54] HOT SPIKE MIXER

[75] Inventor: David L. Wright, Lake Park, Fla.

[73] Assignee: The United States of America as represented by the Secretary of the Air Force, Washington, D.C.

[21] Appl. No.: 82,354

[22] Filed: Oct. 5, 1979

[51] Int. Cl.³ .............................................. F02K 3/08
[52] U.S. Cl. ........................................ 60/261; 60/262; 415/217
[58] Field of Search ................. 60/261, 262; 415/216, 415/217

[56] References Cited

U.S. PATENT DOCUMENTS

| 2,735,612 | 2/1956 | Hausmann | 415/216 |
| 2,801,790 | 8/1957 | Doll | 415/216 |
| 2,978,868 | 4/1961 | Puffer | 60/261 |
| 3,540,216 | 11/1970 | Quillevere | 60/261 |
| 3,595,024 | 7/1971 | Kohler | 60/261 |
| 3,747,345 | 7/1973 | Markowski | 60/261 |
| 3,930,370 | 1/1976 | Markowski | 60/261 |

*Primary Examiner*—Douglas Hart
*Attorney, Agent, or Firm*—Donald J. Singer; Jacob N. Erlich

[57] ABSTRACT

A mixer at the exit opening of a high performance jet engine to prevent premature migration of the core flow into the duct stream thereby operating to eliminate hot streaks in the augmentor and nozzle areas during augmentation. The mixer consists of a concave fillet positioned on the pressure side of the turbine exit guide vane and exhaust case at the trailing edge.

1 Claim, 2 Drawing Figures

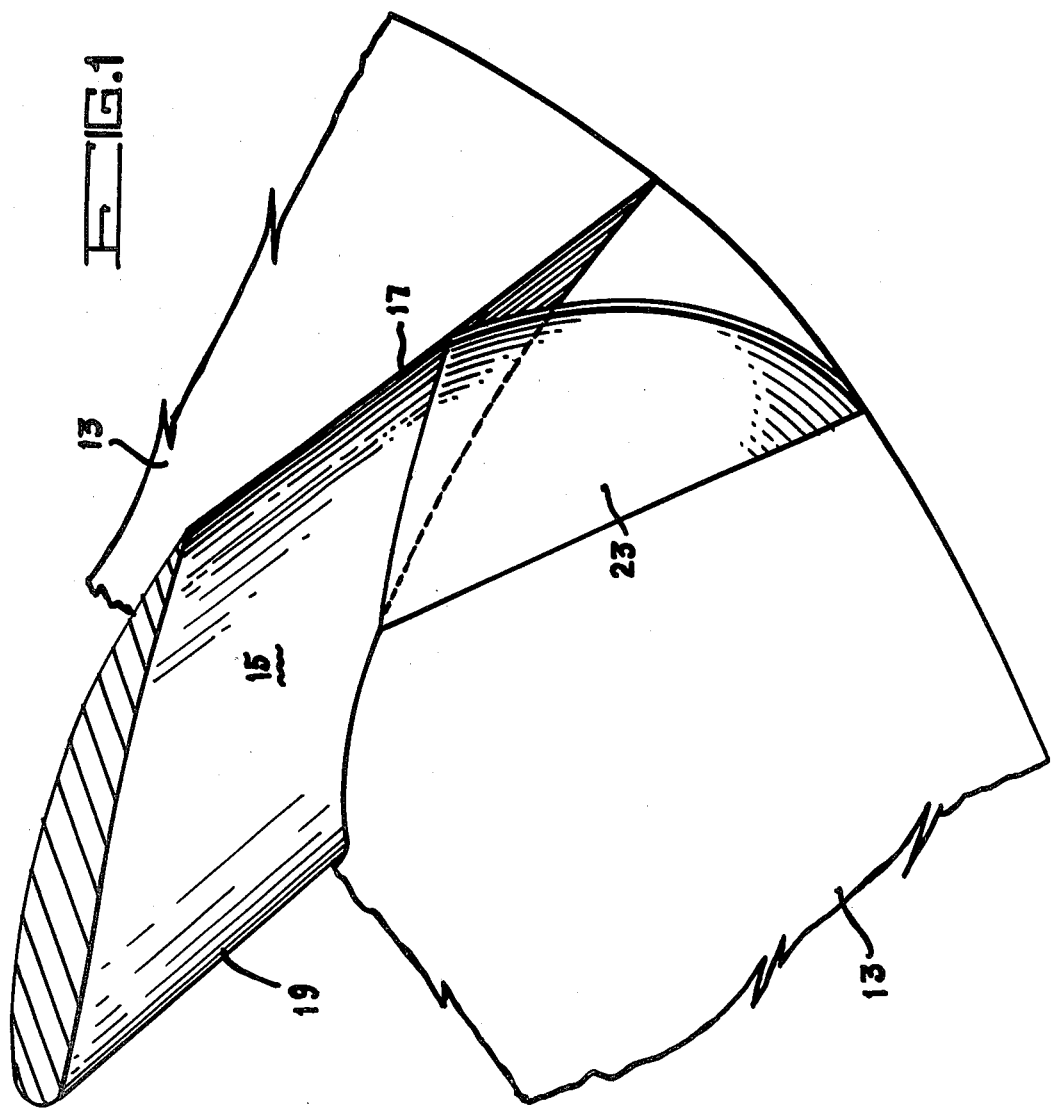

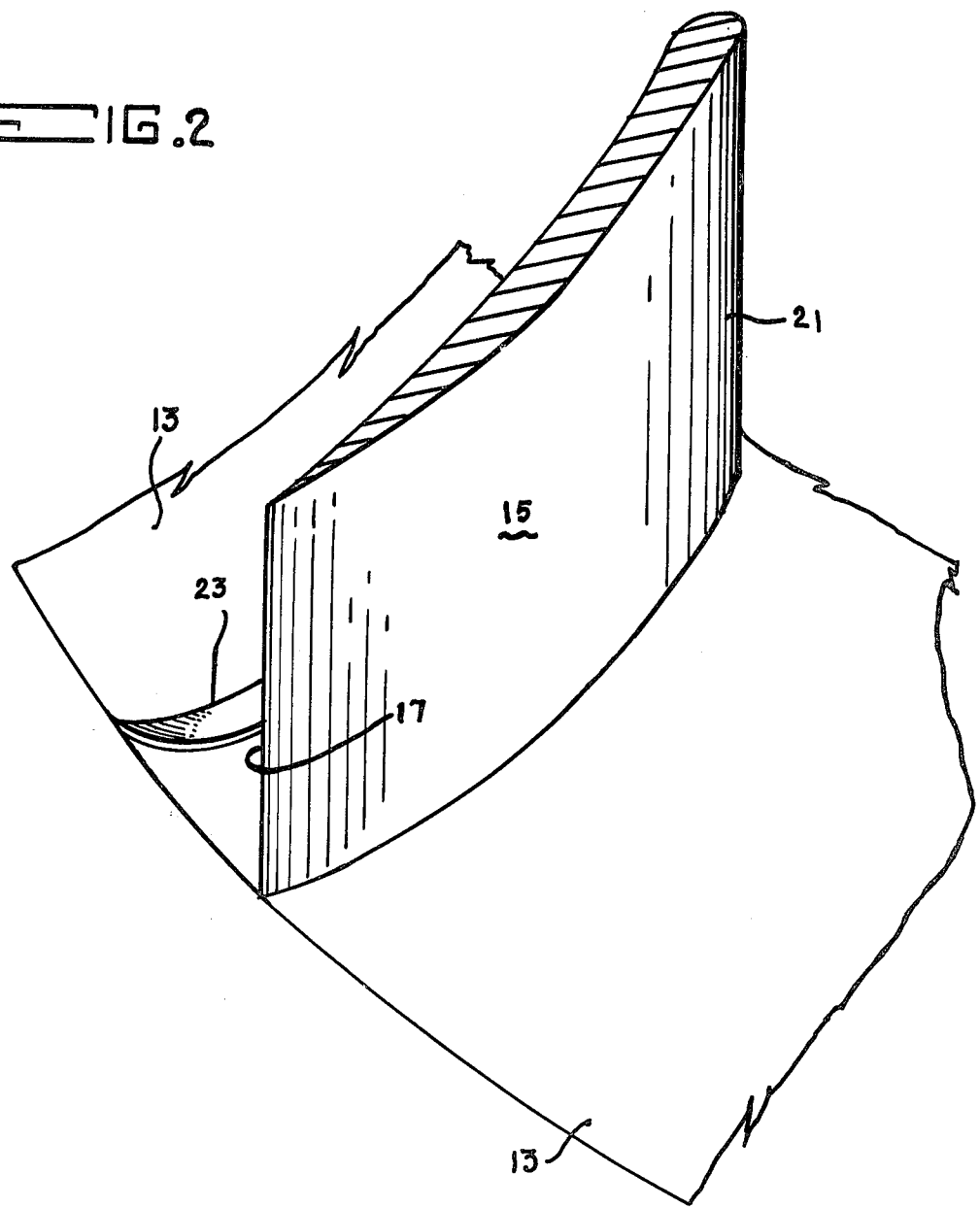

HOT SPIKE MIXER

STATEMENT OF GOVERNMENT INTEREST

The invention described herein may be manufactured and used by or for the Government for governmental purposes without the payment of any royalty thereon.

BACKGROUND OF THE INVENTION

This invention relates to a hot spike mixer for use in a jet engine afterburner and, more particularly, the invention is concerned with providing a mixing device for preventing the premature migration of the core flow into the duct stream to eliminate hot streaks in the augmentor and nozzle areas during augmentation.

Heretofore, a serious problem has arisen in the augmentor or afterburner section of high performance jet engines caused by the premature migration of the core flow into the duct stream. This produces hot streaks in the augmentor and nozzle areas during augmentation. The presence of hot streaks in the augmentor operates to shorten its life or, in the alternative, requires the use of a more expensive design. Thus, it would be most desirable to provide a mixing arrangement which would prevent the formation of hot streaks in the augmentor. The hereinafter described invention does in fact disclose a mixing apparatus which is very localized and operates on the flow field emanating from the pressure side of the turbine exit guide vane to prevent the premature migration of core flow into the duct stream. This serves to eliminate hot streaks in the augmentor and nozzle areas during augmentation as well as to benefit augmentor ignition and engine performance at high altitudes.

SUMMARY OF THE INVENTION

The invention is concerned with providing a mixer which will prevent the premature migration of the core flow into the duct stream to eliminate hot streaks in the augmentor and nozzle areas during augmentation. The hot spike mixer consists of a corner fillet or ramp between the pressure surface of the turbine exit guide vane and the turbine exhaust case trailing edge. The device which is very localized operates on the flow field emanating from the pressure side of the turbine exit guide vane to eliminate hot streaks and thereby increase the life of the augmentor and nozzle hardware and allow less expensive designs to be used.

Accordingly, it is an object of the invention to provide a hot spike mixer for use with a high performance jet engine wherein the premature migration of the core flow is prevented from entering the duct stream so that hot streaks in the augmentor can be eliminated.

Another object of the invention is to provide a mixing device for use in a jet engine to prevent premature migration of the core flow into the duct stream. The apparatus includes a concave fillet positioned on the ramp between the pressure side of the turbine exit guide vane and the exhaust case at the vane trailing edge.

Still another object of the invention is to provide a hot spike mixer in a jet engine augmentor to eliminate hot streaks in the nozzle area during augmentation.

A further object of the invention is to provide an exhaust mixing device for use in a high performance jet engine afterburner augmentor to aid in ignition and to increase the efficiency of the augmentor at high altitudes.

These and other objects, features and advantages will become more apparent after considering the following detailed description taken in conjunction with the annexed drawings and appended claims.

BRIEF DESCRIPTION OF THE DRAWINGS

FIG. 1 is a schematic view in perspective of the hot spike mixer according to the invention showing the concave cover fillet; and FIG. 2 is a schematic view in perspective of the hot spike mixer of FIG. 1 from a different angle.

DESCRIPTION OF THE PREFERRED EMBODIMENT

Referring now to the Figures in which like reference numerals refer to like elements in the two views, there is shown a portion of the rearward section of the turbine exhaust case 13 of a jet engine. A turbine exit guide vane 15 includes a trailing edge 17 which terminates at the rearward end of the turbine exhaust case 13. The turbine exit guide vane 15 is curved to provide a pressure surface 19 and a suction surface 21 as the exhaust gases pass through the exhaust case 13.

The hot spike mixer which is attached to the engine for the purpose of eliminating hot streaks in the augmentor and nozzle areas during augmentation includes a corner fillet or ramp 23 positioned between the pressure surface 19 of the turbine exit guide vane 15 and the turbine exhaust case 13. The ramp 23 is of concave configuration and operates to mix the gases as they pass along the pressure side 19 of the turbine exit guide vane 15. It can be seen that the hereinbefore described hot spike mixer is a very localized device which operates on the flow field emanating from the pressure side of the turbine exit guide vane 15 to eliminate hot streaks in the augmentor and nozzle areas during augmentation by preventing the premature migration of the core flow into the duct stream. The elimination of the hot streaks will effectively increase the useful life of the augmentor and nozzle hardware and will also allow less expensive designs to be used. Additional benefits in the form of improved augmentor ignition and engine performance at higher altitudes can be achieved using the hereinbefore described invention.

Although the invention has been illustrated in the accompanying drawings and described in the foregoing specification in terms of a preferred embodiment thereof, the invention is not limited to this embodiment. It will be apparent to those skilled in the art that the various elements which comprise the hereinbefore described hot spike mixer can be modified to provide the optimum configuration without departing from the true spirit and scope of the appended claims.

Having thus set forth the nature of my invention, what I claim and desire to secure by Letters Patent of the United States is:

1. A hot spike mixer for installation on a turbine exit guide vane at an outer portion of a turbine exhaust case of a high performance jet engine to prevent the premature migration of the core flow into a duct stream, said turbine exit guide vane having a lower portion, a pressure side and a suction side, said mixer comprising a concave fillet positioned on the pressure side of the turbine exit guide vane at a downstream end thereof, said concave fillet including a flow ramp having a small inner end upstream and a large outer end terminating at said outer portion of the turbine exhaust case, said concave fillet being positioned between said lower portion of the turbine exit guide vane and the turbine exhaust case thereby preventing the formation of hot streaks in augmentor and nozzle areas of the jet engine caused by the premature migration of core flow into the duct stream.

* * * * *